United States Patent [19]

Tawara et al.

[11] Patent Number: 4,832,748
[45] Date of Patent: May 23, 1989

[54] COATING COMPOSITION

[75] Inventors: Kunio Tawara; Toshiro Hirose, both of Nagoya, Japan

[73] Assignee: Toagosei Chemical Industry Co., Ltd., Tokyo, Japan

[21] Appl. No.: 109,723

[22] Filed: Oct. 19, 1987

[30] Foreign Application Priority Data

Oct. 21, 1986 [JP] Japan ................................. 61-248427
Jan. 14, 1987 [JP] Japan ................................... 62-5114

[51] Int. Cl.$^4$ ........................ C08L 63/02; C09K 3/00; C08F 283/10
[52] U.S. Cl. .................................... 523/454; 523/463; 523/455; 106/287.11; 106/287.14; 106/287.16; 528/26; 528/27; 528/38; 525/491; 525/504; 525/528; 525/531; 525/532

[58] Field of Search ............. 106/287.1, 18.12, 287.11, 106/287.12, 287.13, 287.14, 287.15, 287.16; 528/27, 26, 38; 525/491, 504, 528, 532, 531; 523/400, 454, 463, 455

[56] References Cited

U.S. PATENT DOCUMENTS

| 3,166,527 | 1/1965 | Ender .................................. 428/418 |
| 4,378,250 | 3/1983 | Treadway et al. ............. 106/287.11 |
| 4,555,561 | 11/1985 | Sugimori et al. ..................... 528/26 |
| 4,642,011 | 2/1987 | Uramoto et al. .................... 411/258 |

Primary Examiner—Paul Lieberman
Assistant Examiner—Helene Kirschner
Attorney, Agent, or Firm—Browdy and Neimark

[57] ABSTRACT

A coating composition comprising (a) an imine obtained by reaction of an organic silicon compound having an aminoalkyl group and at least one alkoxy group with an organic carbonyl compound, (b) a compound having at least one oxirane ring, and optionally (c) a compound having at least one acryloyl or methacryloyl group.

20 Claims, No Drawings

COATING COMPOSITION

FIELD OF THE INVENTION

The present invention relates to a coating composition, and more particularly to a coating composition having an excellent storage stability over a long period of time at room temperature which can form an effective cured coating film by the action of atmospheric moisture or by a mild heat treatment after being coated onto the surface of various articles or materials (hereinafter referred to as a substrate) to prevent the substrate from deteriorations such as corrosion, oxidation, decomposition and the like in various environments. The composition of the present invention is suitable for coating various substrates such as metals, plastics, ceramics, glass, wood and the like and is widely utilizable in various industries such as the mechanical industry, the automobile industry, the electric instrument industry, etc.

BACKGROUND OF THE INVENTION

Hitherto, a variety of treating agents and coating materials have been used for the purpose of protecting substrate surfaces against various corrosive environments. Among them, coating materials capable of forming a film or capable of being cured at ambient temperature have been used widely because they need no thermal energy and hence save energy and simplify the film-forming process. Examples of such coating materials include nitrocellulose type and other clear lacquers, polyurethane type, epoxy type and other two-pack cold setting coating materials, alkyd type, polybutadiene type and other air-drying coating materials, and silicone type and other moisture-curing coating materials.

However, coating materials capable of forming a film or capable of being cured at ambient temperature are generally disadvantageous in the following points.

Clear lacquers which can form a film by mere vaporization of a solvent are inferior in the strength of the coating film and the rustproofing performance, though they give a film of glossy appearance. Two-pack type cold setting coating materials are disadvantageous in that the work for compounding the curing agent requires troublesome procedures of weighing and blending and the blended composition is inferior in workability because of their short pot life, though they give a strong coating film of high adhesive property. Air drying type coating materials are disadvantageous in that the residual unsaturated bonds may inhibit the resistance of the coating film to oxidation and weather, though they can form a coating film which is excellent in water resistance. Silicone type moisture-curing coating materials are inferior in storage stability and rustproofing performance of the coating film, though they are excellent in heat resistance and weather resistance.

Previously in U.S. Pat. No. 4,642,011, the present inventors proposed a metal-rustproofing composition which can be cured at ambient temperature and can exhibit an excellent rustproofing property even in a much smaller thickness of the coating film than those of the usual coating films. However, this composition had a problem that deterioration of product quality, such as an increase in viscosity and formation of insoluble precipitates, can occur when the composition is stored for a long period of time.

Epoxy coating materials using an amine type curing agent are rapidly cured at ambient temperature or low temperatures to form a strong coating film which exhibits an excellent adhesion to metals and a high rustproofing performance, so that they are widely used in various industries.

However, these epoxy-amine type coating materials are two-pack type coating materials and their workability is highly restricted by the troublesome weighing and blending procedures necessary for compounding the curing agent into the resin, as well as by the shortness of pot life. Further, when they are applied to nonmetallic substrates, they do not adhere well, which also limits their applicability. With the aim of solving these problems and attaining adhesion to a wide variety of materials, there have been published various publications, for example, Japanese Patent Application Kokai (Laid-Open) No. 101,100/76, which discloses compounding a compound having acryloyl groups or methacryloyl groups (hereinafter, generically referred to as (meth)acryloyl groups) to improve not only adhesion but also waterproofing adhesion and flexibility and to make the composition applicable to non-metallic substrates such as plastics.

However, such compositions are still two-pack type compositions, so that the laboriousness in procedure is not essentially overcome by these techniques.

The present inventors conducted many studies with the aim of solving the above-mentioned problems of prior coating compositions that they are applicable only to limited kinds of substrates and that they are remarkably limited in workability, and obtaining a composition which is excellent in storage stability and capable of forming a cured coating film excellent in corrosion resistance at ambient temperature or by a mild heat treatment.

SUMMARY OF THE INVENTION

The present inventors have found that the above-mentioned problems can be solved by using, in place of an organic silicon compound having an aminoalkyl group and at least one alkoxy group (hereinafter referred to as "organic silicon compound") constituting the composition previously proposed in U.S. Pat. No. 4,642,011, a reaction mixture containing an imine compound obtained by reacting said organic silicon compound with an organic carbonyl compound. Based on this finding, the present invention has been accomplished.

Thus, the present invention relates to a coating composition comprising (a) an imine obtained by reaction of an organic silicon compound having an aminoalkyl group and at least one alkoxy group with an organic carbonyl compound and (b) a compound having at least one oxirane ring.

Further, the present inventors have discovered that a coating composition particularly excellent in storage stability can be obtained by using a bisphenol A type epoxy resin which is solid at ambient temperature as said compound having at least one oxirane ring and using a compound having two or more carbonyl groups per molecule as said organic carbonyl compound.

Further, the inventors have discovered that a coating composition exhibiting an excellent adhesion also to substrates other than metals can be obtained by using (c) a compound having at least one (meth)acryloyl group in addition to the above-mentioned (a) imine obtained by reaction of an organic silicon compound having at least one alkoxy group and an aminoalkyl group with an organic carbonyl compound and (b) compound having at least one oxirane ring.

DETAILED DESCRIPTION OF THE INVENTION

The organic silicon compound used in the present invention is a compound having an aminoalkyl group and at least one alkoxy group, and it includes the compounds well known as a silane coupler. Its specific examples include aminoalkyltrialkoxysilanes having one aminoalkyl group and three alkoxy groups such as aminomethyltriethoxysilane, γ-aminopropyltriethoxysilane, γ-aminoisobutyltrimethoxysilane and the like; N-(aminoalkyl)-aminoalkyltrialkoxysilanes having one N-(aminoalkyl)-aminoalkyl group and three alkoxy groups such as N-(β-aminoethyl)-aminomethyltrimethoxysilane, N-(β-aminoethyl)-aminomethyltriethoxysilane, N-(β-aminoethyl)-γ-aminopropyltrimethoxysilane and the like; aminoalkylalkyldialkoxysilanes having an aminoalkyl group and two alkoxy groups such as aminomethylmethyldiethoxysilane, γ-aminopropylmethyldiethoxysilane and the like; and N-(aminoalkyl)aminoalkylalkyldialkoxysilanes having one N-(aminoalkyl)aminoalkyl group and two alkoxy groups such as N-(β-aminoethyl)-γ-aminopropylmethyldimethoxysilane and the like. Among these organic silicon compounds, those having two or more alkoxy groups are preferable in the present invention from the viewpoint of high rustproofing property to a substrate.

The term "organic carbonyl compound" used in the present invention means compounds having a carbonyl group. It includes cyclic and non-cyclic ketones and aldehydes. In the present invention, a variety of ketones and aldehydes are used.

Specific examples of said organic carbonyl compound follow. Examples of the ketone include monoketone compounds such as acetone, methyl ethyl ketone, methyl isobutyl ketone, dibutyl ketone, cyclopentanone, cyclohexanone, acetophenone and the like; diketone compounds such as acetylacetone (2,4-pentadione), acetonylacetone (2,5-hexanedione), diacetyl (2,3-butandione), 2,4-hexandione, 1,4-hexandione, 5-methyl-2,4-hexandione, 3-ethyl-2,4-pentandione, 3,3-dimethyl-2,4-pentandione and the like; and ketocarboxylic acid esters such as methyl acetoacetate, ethyl acetoacetate, butyl acetoacetate and the like. Examples of the aldehyde include benzaldehyde, n-butyraldehyde and the like.

After the composition of the present invention is coated onto a substrate, the organic carbonyl compound of the present invention which has taken the form of an imine compound till that time, is liberated from the imine compound by the action of atmospheric moisture as will be mentioned later. At this time, it is desired that the liberated organic carbonyl compound is rapidly vapourized from the coating film as a volatile component at ambient temperature or low temperature. Accordingly, as the organic carbonyl compound, a compound having a low vapor pressure is preferred. Further, it is preferable that the organic carbonyl compound readily form an imine compound in the imine-forming step mentioned later. Accordingly, as said organic carbonyl compound, those having two or more carbonyl groups, particularly ketones selected from the dicarbonyl compounds of which at least one carbonyl group is a ketone carbonyl group, are preferred. Specific examples of such ketone include acetylacetone, acetonylacetone, methyl acetoacetate, ethyl acetoacetate and the like.

The imine which is one constituent of the composition of the present invention is obtained by reacting the above-mentioned organic silicon compound and organic carbonyl compound. This reaction is a dehydration reaction represented by the following scheme:

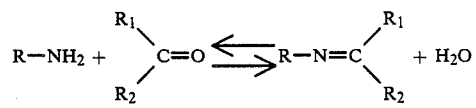

which is carried out in accordance with the aminealdehyde reaction mentioned in The MERCK INDEX of Chemicals and Drugs, 7th ed., Merck & Co., Inc., p.1466 (Schiff base forming reaction). This reaction is an equilibrium reaction, and the equilibrium shifts to the right side when the resulting water is distilled off from the system.

Specific procedural conditions for the production of an imine are as follows.

In reacting the starting organic silicon compound and organic carbonyl compound, these compounds are preferably used in equal amounts, or the organic carbonyl compound is used in excess. That is, the molar ratio of the organic silicon compound to the organic carbonyl compound is preferably 1:1–100 and more preferably 1:1.05–20. Though the reaction temperature varies depending on the kinds of the organic silicon compound and organic carbonyl compound used, it is usually in the range of from ambient temperature to 200° C., and preferably from 50° C. to 150° C. The reaction time is 1 to 600 minutes, and preferably 5 to 300 minutes. At the time of reaction, a solvent such as toluene and the like, a catalyst such as hydrochloric acid and the like, a filler, and the like may be added, if they are necessary. The reaction pressure may be near atmospheric pressure, though elevated or reduced pressure may also be employed if desired. In producing the imine, removal of the resulting water is quite effective for shifting the equilibrium to the right side. For this purpose, the use of a solvent forming an azeotropic mixture with water, such as cyclohexane, toluene, xylene and the like as an entrainer is recommended. It is also possible to accelerate the reaction by the use of a dehydrating agent such as silica gel, molecular sieve and the like.

The reactor is not special, and conventional tank type reactors equipped with a heating jacket and a stirrer can be used.

If a compound having two or more carbonyl groups such as diketone compounds (e.g. acetylacetone, acetonylacetone and the like) and β-ketocarboxylic acid ester compounds (e.g. methyl acetoacetate, ethyl acetoacetate and the like) is used as the organic carbonyl compound, an imine can be formed without the above-mentioned dehydration means and a quite stable composition of the present invention can be obtained.

The compound having at least one oxirane ring used in the present invention include those generally referred to as epoxy compounds or epoxy resins. They are compounds having oxirane ring on their molecular terminals or in their molecular chains, and their examples include the following (1) to (6):

(1) bisphenol type epoxy resins; e.g.,

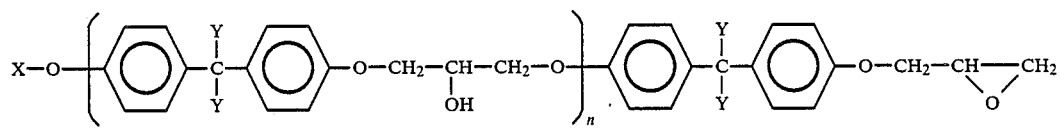

wherein
X=

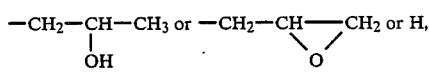

Y=alkyl group or H,
and the like;
(2) novolac type epoxy resins; e.g.,

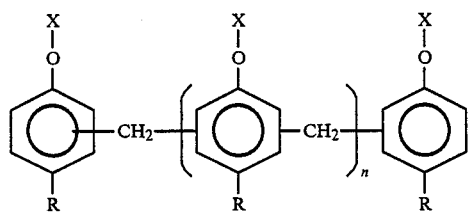

wherein
X=

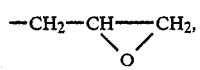

R=alkyl group, aralkyl group, and the like;
(3) glycidylamine type epoxy resins; e.g.,

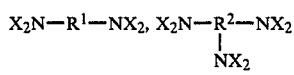

wherein
X=

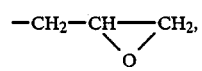

$R^1$ and $R^2$ =alkylene group, aralkylene group, cycloalkylene group and the like;
(4) heterocyclic epoxy resins; e.g., hydantoin type epoxy resins, triglycidyl isocyanurate and the like;
(5) glycidyl ester type epoxy resins; e.g.,

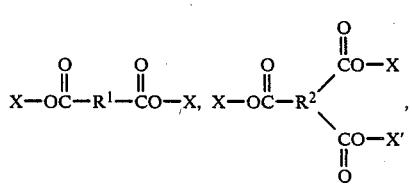

-continued

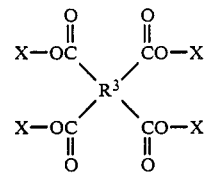

wherein
X=

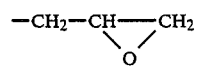

$R^1$, $R^2$ and $R^3$=2-, 3- and 4-valent organic groups, respectively;
(6) organic silicon compounds having oxirane ring and alkoxy group; e.g., glycidoxyalkyltrialkoxysilanes (e.g. γ-glycidoxypropyltrimethoxysilane, β-(3,4-epoxycyclohexyl)-ethyltrimethoxysilane and the like); glycidoxyalkylalkyldialkoxysilanes (e.g. γ-glycidoxypropylmethyldimethoxysilane, β-(3,4-epoxycyclohexyl)ethylmethyldimethoxysilane and the like); and the like. Among these oxirane ring-containing compounds, those preferably used in the present invention are the bisphenol type epoxy resins (1) and the epoxysilanes (6).

Oxirane ring-containing compounds more preferably used in the present invention are those having two or more hydroxyl groups per molecule, and particularly preferred compounds are the above-mentioned bisphenol A type epoxy resins having two or more hydroxyl groups wherein Y of the structural formula is methyl group. Its concrete examples include bisphenol A type epoxy resins solid at ambient temperature such as Epikote 1001, 1004, 1007, 1009 and the like (manufactured by Yuka Shell Epoxy K. K.). The reason why the compounds having two or more hydroxyl groups per molecule are preferred among the wide variety of oxirane ring-containing compounds of the present invention is that the amino group of an organic silicon compound liberated from the corresponding imine compound quite readily reacts with the oxirane ring. Compounds having fewer than two hydroxyl groups per molecule react only slowly and therefore take a long period of time for forming a coating film, while compounds having two or more hydroxyl groups per molecule can form a strong and tough cured coating film in a short period of time. This would probably be owing to the great contribution of the hydroxyl groups in the compound to the reaction with an organic silicon compound.

Next the compound having at least one (meth)acryloyl group optionally used in the present invention is a compound having at least one (meth)acryloyl group in its molecule. Its examples include the followings:
(1) polyol poly(meth)acrylates; i.e., poly-(meth)acrylates of polyhydric alcohols such as ethylene glycol, propylene glycol, neopentyl glycol, glycerin, trimethylolpropane, pentaerythritol and the like;

(2) polyether poly(meth)acrylates; i.e., poly(meth)acrylates of polyether polyols such as polyethylene glycol, polypropylene glycol, polytetramethylene glycol, and alkylene oxide adducts of the polyhydric alcohols mentioned in (1);

(3) polyester poly(meth)acrylates; i.e., poly(meth)acrylates of polyester polyols formed from at least one polybasic acid such as succinic acid, adipic acid, sebacid acid, phthalic acid, isophthalic acid, terephthalic acid, hexahydrophthalic acid, maleic acid, tetrahydrophthalic acid, trimellitic acid, pyromellitic acid and the like and at least one polyol or polyether polyol mentioned in (1) and (2);

(4) polyurethane poly(meth)acrylates; i.e., poly(meth)acrylates having a polyurethane skeleton such as the reaction product formed between hydroxyalkyl (meth)acrylates and terminal isocyanate type urethane prepolymers obtained by reacting a polyvalent isocyanate (e.g., tolylene diisocyanate, xylylene diisocyanate, diphenylmethane diisocyanate, hexamethylene diisocyanate, isophorone diisocyanate and the like) with the polyols, polyether polyols or polyester polyols mentioned in (1) to (3);

(5) epoxy poly(meth)acrylates; i.e., addition products formed from (meth)acrylic acid or a terminal carboxy (meth)acrylate and a polyvalent epoxy compound such as the glycidyl ether type or glycidyl ester type polyvalent epoxy compounds obtained by condensing epichlorohydrin with a phenolic compound, a polyol or polyether polyol mentioned in (1) and (2), a dimer acid, a polybasic acid mentioned in (3), or the like; cycloaliphatic polyvalent epoxy compounds; epoxy-containing epoxy esters obtained by reacting these polyvalent epoxy compounds with a polybasic acid, and the like;

(6) mono(meth)acrylates; i.e., terminal hydroxy (meth)acrylates such as 2-hydroxyethyl (meth)acrylate, tetramethylene glycol monoacrylate, polyethylene glycol mono(meth)acrylate, polypropylene glycol mono(meth)acrylate, and the like;

(7) mono(meth)acrylates having alkoxysilyl group; e.g., 3-(meth)acryloxypropyltrimethoxysilane, 3-(meth)acryloxypropylmethyldimethoxysilane, and the like.

Although the (meth)acryloyl group-containing compound used in the present invention is not special as shown above, preferably the unpleasant or irritating odor emitted in the practical coating process should be as slight as possible. Accordingly, those having a boiling point of at least 200° C. at atmospheric pressure are preferable, and those having a boiling point of at least 300° C. are more preferable. Those having a weight average molecular weight not lower than 200 and not higher than 100,000 are preferable, and those having a weight average molecular weight not lower than 300 and not higher than 10,000 are more preferable.

In order that, after the coating process, the organic silicon compound having aminoalkyl group which has been liberated by the action of atmospheric moisture can take part in an addition reaction and further said organic silicon compound which has been hydrolyzed and then subjected to condensation can give a strong coating film, said (meth)acryloyl group-containing compound should desirably be a compound having two or more (meth)acryloyl groups per molecule. Accordingly, the above-mentioned poly(meth)acrylates (1) to (5) are preferable.

As mentioned above, the composition of the present invention is characterized by comprising two ingredients or three ingredients. In case of two ingredients, the weight ratio of the imine compound to the oxirane ring-containing compound is preferably 1:0.1 to 10 and more preferably 1:0.5 to 5.

When the oxirane ring-containing compound is an epoxy resin and the organic carbonyl compound is a compound having two or more carbonyl groups, the imine-containing composition of the present invention can be obtained by directly compounding these ingredients with an organic silicon compound. In case of three ingredients, the total amount of (meth)acryloyl groups and oxirane rings in the composition is preferably 0.2 to 50 equivalents and more preferably 0.4 to 10 equivalents per equivalent of the imine.

If the compounding ratio of these ingredients is out of the above-mentioned ranges, film-formability, curing velocity and coating film properties such as rustproofing performance are diminished, when the present composition is coated onto objective substrates.

The weight ratio of the (meth)acryloyl group-containing compound to the oxirane ring-containing compound is preferably 10/90 to 99/1 and more preferably 20/80 to 95/5. If the proportion of the (meth)acryloyl group-containing compound is smaller than 10% by weight, properties of the resultant coating film such as flexibility and light resistance cannot be improved.

The object of the present invention has been achieved by converting an organic silicon compound to an imine so that the oxirane ring-containing compound and if desired, (meth)acryloyl group-containing compound which are reactive with amino group can have a good storage stability in the liquid composition and they can rapidly react after being coated. However, if the organic silicon compound is completely converted to the corresponding imine, curing velocity of the resultant coating film decreases, even though the above-mentioned object can be achieved. Accordingly, coexistence of the organic silicon compound and the imine is preferable for the present invention. Thus, it is preferable that the imine and organic silicon compound coexist at a molar ratio of 30–99:70–1, and particularly 40–90:60–10. If the molar proportion of the imine is smaller than 30%, the composition cannot be satisfactory in storage stability and an increase in viscosity or a gelation takes place to cause troubles. Further, there is a tendency that such a composition is not high in rustproofing performance when coated on metal surfaces. Although the reasons for the deteriorations in storage stability, coating film properties and durability are not clearly known, it is probable that the excessively existing free amino groups readily react with the (meth)acryloyl group-containing compound or oxirane ring-containing compound so that the reaction partially proceeds before the coating process to lower the rustproofing performance. On the other hand, if the proportion of the imine exceeds 99% by mole, the curing velocity tends to be low when the composition is coated onto a metal surface, so that the coating film remains sticky and properties of the coating film are not good.

The carbonyl compound used in the present invention has a function as a solvent, too, in itself. However, a wide variety of conventional polar and nonpolar solvents may be used in combination with it in order to make the composition of the present invention into a homogeneous solution and use it as a rustproofing composition having an appropriate coating property. Concrete examples of said solvent include aromatic hydrocarbon solvents such as benzene, toluene, xylene and the like; alicyclic hydrocarbon solvents such as cyclohexane and the like; ketone solvents such as acetone, methyl ethyl ketone, methyl isobutyl ketone and the like; alcoholic solvents such as methanol, ethanol, isopropanol, butanol and the like; ester solvents such as ethyl acetate, butyl acetate and the like; and ethers such as ethyl ether, methyl cellosolve, ethyl cellosolve, butyl cellosolve and the like. In the present invention, one member or an appropriate combination of two or more members selected from these solvents may be used.

When a solvent is used, the total concentration of the imine compound, the oxirane ring-containing compound and the unreacted silicon compound in the composition is preferably 50% by weight or below, and more preferably 30% by weight or below.

A variety of additives may be added to the composition of the present invention for various purposes.

Examples of the additive include a rustproofing agent for improving rustproofing performance such as chromates, phosphates and the like; a condensation catalyst for accelerating the formation of siloxane linkage such as heavy metal salts of organic carboxylic acids, ammonium salts of organic acids, metal alcoholates, amine compounds and the like; a thixotropic agent for improving the flow property at the time of coating such as finely powdered silica, bentonite and the like; an antioxidant for protecting the coating film against thermal oxidation and photo-degradation such as phenol type, phosphorus type and sulfur type antioxidants; an ultraviolet absorber such as benzotriazole, benzophenone and the like; and dyes and pigments for improving the appearance of the coating film and reinforcing it.

The composition of the present invention can be prepared by mixing together the above-mentioned imine-containing reaction mixture, oxirane ring-containing compound and, if desired, (meth)acryloyl group-containing compound at room temperature or a somewhat elevated temperature preferably in the presence of a solvent. In the above-mentioned production step of an imine, the reaction must be stopped at a certain stage to obtain a state that the starting organic silicon compound and the resulting imine coexist in the system or a state that the two compounds exist in specified concentration ranges. This is a condition preferable for achieving the object of the present invention, as mentioned above. An excessive amount of a ketone or an aldehyde and a solvent used as an entrainer can be used as a solvent as they are, and therefore as an embodiment of the present invention it is possible to mix an oxirane ring-containing compound and, if desired, a (meth)acryloyl group-containing compound into the liquid of the above-mentioned mixed state where the two compounds exist and uniformly dissolve them together. This embodiment is economically advantageous because separation of the resulting imine is unnecessary.

When a compound having two or more carbonyl groups is used as the organic carbonyl compound and an epoxy resin is used as the oxirane ring-containing compound, an imine-containing reaction mixture can be obtained without any means of dehydration. In such a case, the composition of the present invention can be obtained by mixing an organic silicon compound and an epoxy resin into said carbonyl compound at ambient temperature or an elevated temperature, and a more preferable embodiment in such a case comprises mixing and dissolving together an organic silicon compound and the carbonyl compound and thereafter dissolving an epoxy resin thereinto.

The composition of the present invention is applicable to a wide variety of substrates such as metals, plastics, ceramics, glass, wood and the like. It is particularly successfully applicable to iron and iron alloys, copper and copper alloys, aluminum and aluminum alloys, and metallic substrates which have been subjected to various platings such as zinc plating, cadmium plating, chromium plating, nickel plating and the like. It exhibits particularly excellent adhesion durability and rustproofing performances under wet conditions when applied to a substrate which has been zinc plated or zinc alloy plated and then chromate-treated.

When it is applied to non-metallic substrates, addition of a (meth)acryloyl group-containing compound is preferred.

As a method for applying the composition of the present invention to a substrate, there can be adopted a method which comprises heating and liquefying the composition and then dipping the substrate into it and a method which comprises pulverizing the composition and coating it by the well known powder coating process. Preferably, as mentioned before the composition is dissolved into a solvent and then the resulting solution is coated by known coating processes such as spray coating, dip coating, brush coating, roll coating, and the like. After the coating process, the solvent is removed at ambient temperature or with heating, whereby a uniform coating film is formed and the object of the present invention is achieved. Thickness of the coating film is 1 to 300 $\mu$m, preferably 1 to 100 $\mu$m, and more preferably 1 to 30 $\mu$m. Even if it has so small a thickness as a few microns, it can protect a substrate against corrosive environments and give the substrate a good durability. This is an important characteristic feature of the present invention.

As mentioned above, the present inventors have conducted many studies with the aim of improving the storage stability, coating film properties and curability at ambient temperature of a coating composition. As a result, the object has been achieved by using a composition comprising an imine-containing reaction mixture formed by reacting an organic silicon compound having an aminoalkyl group and at least one alkoxy group with an organic carbonyl compound, an oxirane ring-containing compound and, if desired, a (meth)acryloyl group-containing compound. The imine which is a condensate formed by the reaction between the organic carbonyl compound and the organic silicon compound, exists stably during storage together with the oxirane ring-containing compound and the optionally used (meth)acryloyl group-containing compound. If the composition is once applied to a metallic substrate or the like and exposed to atmosphere, the organic silicon compound is regenerated by the action of atmospheric moisture and it begins an addition reaction to the oxirane ring-containing compound and the optionally used (meth)acryloyl group-containing compound. At the same time the organic silicon compound starts a self-condensation reaction to form siloxane linkages, so that a highly crosslinked rustproofing coating film is formed.

The imine which is a reaction product formed between the organic silicon compound and the organic carbonyl compound is an indispensable ingredient of the present invention also from the viewpoint of long-term storage stability. Though the reason for this fact is unknown, it would probably be as mentioned below.

(1) The formation of the imine decreases the reactivity of amino group with oxirane ring and the optionally used (meth)acryloyl group.

(2) Similarly, the formation of the imine decreases the accelerative effect on the self-condensation of alkoxy groups.

(3) The imine captures a minute quantity of water which enters into the composition from atmosphere.

If the composition of the present invention is applied to a substrate, the organic silicon compound regenerated by the above-mentioned action reacts with the oxirane ring-containing compound and the optionally used (meth)acryloyl group-containing compound and furthermore with itself to form a composite coating film and bring about the following merits.

(1) Owing to the combined use of the oxirane ring-containing compound and the (meth)acryloyl group-containing compound, the coating film properties can be diversified and the applicability of the composition can be expanded.

(2) A coating film can be formed merely by dipping a substrate into the composition preferably diluted with a solvent and then air-drying it or mildly heating it. Moreover, a high durability can be realized by such a simple procedure. Further, the composition itself keeps a high storage stability over a long period of time.

(3) The coating film formed on a substrate exhibits a high rustproofing performance even if its thickness is so small as 1 to 10 microns, so that there is no trouble concerning working and process due to the increased thickness of the substrate by the coating film.

(4) The coating film is transparent and does not color a substrate.

(5) When the composition is applied to metallic substrates, no addition of a toxic rustproofing pigment is required. This is advantageous from the viewpoint of environmental hygiene.

In addition, the composition of the present invention is excellent in its storage stability, that is, it is free from increase in viscosity and gelation so far as it is handled in the usual manner and it forms no insoluble precipitate during storage, and therefore it causes no deterioration in coating film properties.

EXAMPLES 1 TO 6 AND COMPARATIVE EXAMPLE 1

Into a four-necked flask equipped with a stirrer, a thermometer and a distilling device were charged 22.1 g (0.10 mole) of γ-aminopropyltriethoxysilane (molecular weight 221) and 200.0 g (2.00 moles) of methyl isobutyl ketone (molecular weight 100). At a reaction temperature of 105° to 115° C., a dehydrating reaction was carried out until 20% by mole of γ-aminopropyltriethoxysilane reacted, while distilling out the methyl isobutyl ketone and measuring the amount of distilled water. In Table 1 there are shown the amount of distilled methyl isobutyl ketone, the percentage of residual γ-aminopropyltriethoxysilane and the percentage of the resulting imine compound. In order to compensate the distilled methyl isobutyl ketone, dehydrated methyl isobutyl ketone was added to keep its initial amount.

Then, 33.2 g of Epikote 1001 (bisphenol A type epoxy resin solid at ambient temperature manufactured by Yuka Shell Epoxy K. K.) wa added therein and the mixture was dissolved together and homogenized to obtain a composition (Run No. 2).

In other runs (Run Nos. 3, 4, 5, 6 and 7), compositions were prepared in the same manner as above, except that methyl isobutyl ketone was distilled off so that the percentage of reacted γ-aminopropyltriethoxysilane reached about 40, 60, 80, 90 and 100% by mole and then dehydrated methyl isobutyl ketone and the epoxy resin were added.

In another run (Run No. 1), a yellow-colored homogeneous transparent composition was prepared by dissolving the epoxy resin into a mixture having the same formulation as above without subjecting the mixture to a dehydrating reaction with methyl isobutyl ketone.

Each of these resin compositions was diluted with 113.4 g of toluene to control its viscosity, and then subjected to the following tests.

A plate (70×150×0.8 mmt) which had been zinc plated and treated with yellow chromate, was coated with each of the above-mentioned diluted compositions by the method of dipping and then it was air-dried. After about 30 minutes, its dry hardness (curability) to the touch was examined.

Further, each composition was placed in a tinned petroleum can having a capacity of 500 cc and the can was dipped in a water bath at 40° C., and the change in the state of the composition was observed. The results are summarized in Table 1.

TABLE 1

| | | State of reaction | | | Test results | |
|---|---|---|---|---|---|---|
| | Run No. | Amount of distilled MIBK (g) | Residual percentage*1 (% by mole) | Percentage of formation*2 (% by mole) | Curability at room temp. (after 30 min.) | Storage stability (40° C.) |
| Comparative Example 1 | 1 | 0 | — | — | O Not sticky | X Precipitate after 3 days |
| Example 1 | 2 | 30 | 83 | 17 | O Not sticky | X Precipitate after 20 days |
| Example 2 | 3 | 58 | 59 | 41 | O Not sticky | O No change after 30 days |
| Example 3 | 4 | 88 | 40 | 60 | O Not sticky | O No change after 30 days |
| Example 4 | 5 | 102 | 18 | 82 | O Not sticky | O No change after 30 days |
| Example 5 | 6 | 119 | 11 | 89 | O Not sticky | O No change after 30 days |
| Example 6 | 7 | 135 | 3 | 97 | ΔSlightly sticky | O No change after 30 days |

*1 Percentage of residual organic silicon compound
*2 Percentage of formed imine compound

EXAMPLES 7 TO 8

In the same manner as in Run Nos. 2 to 7, 22.1 g of γ-aminopropyltriethoxysilane, 150 g of methyl ethyl ketone (molecular weight 72) and 150 g of toluene were charged into a four-necked flask equipped with a stirrer, a thermometer and a distilling device, and the mixture was subjected to a dehydrating reaction by utilizing the water-toluene azeotropy at 80° to 100° C. until the amount of distilled liquid reached 100 g. Based on the weight of water distilled out, the formation of the corresponding imine compound was estimated to be about 52%.

Then, 41 g of Epikote 1007 (bisphenol A type epoxy resin solid at ambient temperature manufactured by Yuka Shell Epoxy K. K.) and 157.6 g of toluene were mixed and dissolved into the mixture obtained above. Thus, a uniform yellow-colored transparent solution was obtained (Run No. 8).

In the same manner as above, Epikote 1004 (manufactured by Yuka Shell Epoxy K. K.) was mixed and dissolved in place of Epikote 1007 after formation of the imine compound to obtain a resin solution (Run No. 9).

A plate which had been zinc plated and then subjected to lustering chromate treatment, was dip-coated with each of the above-mentioned resin solutions and air-dried to obtain a coating film having a thickness of 5 to 7 microns. Three days later, it was rubbed with a xylene-impregnated cloth forward and backward 30 times, after which the flaw of rubbing formed on the coating film was visually examined and evaluated. Further, a test piece prepared in the above-mentioned manner was subjected to a saline water spraying test for a period of 240 hours according to JIS-Z-2371.

The residual portion of each of the resin solutions was poured into a tinned petroleum can having a capacity of 500 cc and sealed and the can was dipped in a water bath at 40° C., and the change in the state of the composition was observed. The results are summarized in Table 2.

the above-mentioned residual solution to obtain a uniform yellow-brown colored transparent solution.

It was subjected to the same tests as in Run No. 8. It exhibited a good solvent resistance and showed no flaw after rubbing. In the saline water spraying test, no white rust was observed after a lapse of 240 hours In the storage stability test at 40° C., formation of white colored precipitate was only very slight after a lapse of 30 days.

EXAMPLES 10 TO 14

Into a reactor equipped with a stirrer were charged 44.2 g (0.20 mole) of γ-aminopropyltriethoxysilane (molecular weight 221) and 20.0 g (0.20 mole) of acetylacetone (molecular weight 100). By stirring the charged mixture for 2 hours at room temperature, a condensation product was obtained. Then, 66.4 g of Epikote 1004 (bisphenol A type epoxy resin solid at ambient temperature, manufactured by Yuka Shell Epoxy K. K.) was added to the condensation product, and further a methyl ethyl ketone/toluene mixture (1/1 by weight) was added as a solvent to dissolve the resin mixture and prepare a composition having a resin concentration of 15% by weight (Run No. 14).

In other runs (Run Nos. 12, 13 and 15), compositions were prepared in the same manner as above, except that the amount of charged acetylacetone was 4.0 g (0.04 mole), 6.0 g (0.06 mole) and 100.0 g (1.00 mole), respectively.

In another run (Run No. 11), a composition was prepared in same manner as above, except that acetylacetone was replaced with 20.0 g (0.20 mole) of methyl isobutyl ketone (molecular weight 100).

The resin solutions thus obtained were subjected to the following tests.

A plate (70×150×0.8 mmt) which had been zinc plated and then treated with yellow chromate, was dip-coated with each of these solutions and then air-dried for a predetermined period of time, after which its drying hardness (curability) to the touch was examined.

TABLE 2

| Example No. | Run No. | State of reaction | | | Epoxy resin | | | Performances of coating film | | Storage stability (40° C.) |
|---|---|---|---|---|---|---|---|---|---|---|
| | | Weight of distilled liquid (g) | Residual percentage*1 (% by mole) | Percentage of formation*2 (% by mole) | Name | State | Number of OH groups per molecule | Solvent resistance | Saline water spray test (after 240 hrs.) | |
| Example 7 | 8 | 100 | 41 | 59 | Epikote 1007 | Solid | 12.08 | No change | O No rust | No change O after 30 days |
| Example 8 | 9 | 100 | 43 | 57 | Epikote 1004 | Solid | 3.80 | No change | O No rust | No change O after 30 days |

*1, *2: The same as in Table 1.

EXAMPLE 9 (Run No. 10)

In the same manner as in Run No. 8, 22.1 g of γ-aminopropyltriethoxysilane, 12.7 g of benzaldehyde (molecular weight 106) and 287.3 g of toluene were charged and subjected to a dehydrating reaction at 80° to 100° C. until the weight of distilled liquid reached 100 g.

It was found that the formation of the corresponding imine in the residual solution was about 83%. Then, 41 g of Epikote 1007 (bisphenol A type epoxy resin) and 157.6 g of anhydrous ethyl cellosolve were mixed into Further, each composition was placed in a tinned petroleum can having a capacity of 500 cc and dipped in a water bath at 40° C, after which the change in the state of the composition was visually examined. The results are summarized in Table 3.

Further, a test plate prepared in the same manner as above was subjected to a saline water spraying test for 600 hours (JIS-Z-2371). The results are shown in Table 3. As a comparative sample, a non-coated test piece was also tested. On this test piece, red rust was observed after 600 hours.

TABLE 3

| Run No. | Molar ratio of Acetylacetone/Organic silicon compound | Curability at room temperature (after 30 min.) | Storage stability (40° C.) | Saline water spray test (after 600 hrs.) |
|---|---|---|---|---|
| Example 10 | 11 | 0 | O Not sticky | X Precipitate after 10 days | White rust slightly formed |
| Example 11 | 12 | 0.2 | O Not sticky | Δ Gelation after 65 days | White rust slightly formed |
| Example 12 | 13 | 0.3 | O Not sticky | O No change after 90 days | White rust slightly formed |
| Example 13 | 14 | 1.0 | O Not sticky | O No change after 90 days | No rust formed |
| Example 14 | 15 | 5.0 | Δ Slightly sticky | O No change after 90 days | White rust slightly formed |

EXAMPLES 15 To 16

In a flask equipped with a stirrer, 44.2 g (0.20 mole) of N-(β-aminoethyl)-γ-aminopropyltrimethoxysilane (molecular weight 222), 65.0 g (0.50 mole) of ethyl acetoacetate (molecular weight 130) and 150 g (1.50 moles) of acetylacetone (molecular weight 100) were charged and reacted for one hour at room temperature. Then, 41 g of Epikote 1001 (bisphenol A type epoxy resin manufactured by Yuka Shell Epoxy K. K.) was dissolved thereinto and toluene was added to prepare a composition having an ingredient concentration of 20% by weight (Run No. 16).

Another resin solution (Run No. 17) was prepared in the same manner as above, except that the Epikote 1001 was replaced with Epikote 828 (bisphenol A type epoxy resin liquid at room temperature).

These resin solutions were tested for curability at ambient temperature and storage stability in the same manner as in Examples 9–12 and Comparative Example 3. The results are summarized in Table 4.

TABLE 4

| Run No. | Epoxy resin | Curability at room temp. (after 1 day) | Storage stability |
|---|---|---|---|
| Example 15 | 16 | Epikote 1001 Solid at room temp. | O Not sticky | O No change after 90 days |
| Example 16 | 17 | Epikote 828 Liquid at room temp. | X Very sticky | O No change after 90 days |

EXAMPLES 17 To 19

Resin compositions of Run Nos. 18, 19 and 20 were prepared in the same manner as in Run No. 14, except that the acetylacetone was replaced with 20.0 g (0.20 mole) of 2,3-pentandione (molecular weight 100), 22.8 g (0.20 mole) of 2,5-hexandione (molecular weight 114) and 26.0 g (0.20 mole) of ethyl acetoacetate (molecular weight 130), respectively.

A plate which had been zinc plated and then subjected to lustering chromate treatment was dip-coated with each of these resin solutions and air-dried to obtain a coating film having a thickness of 5 to 7 microns. Three days later, it was rubbed with a xylene-impregnated cloth forward and backward 50 times, and then the flaw of rubbing formed on the coating film was visually examined. Further, a test piece prepared in the same manner as above was subjected to a saline water spraying test (JIS-Z-2371) for 240 hours. The residual solution was placed in a tinned petroleum can having a capacity of 500 cc and sealed and then the can was dipped in a water bath at 40° C., after which the change in the state of the composition was observed. The results are summarized in Table 5.

TABLE 5

| | Run No. | Carbonyl compound | Performances of coating film | | Storage stability (40° C.) |
|---|---|---|---|---|---|
| | | | Xylene resistance | Saline water spray test (after 240 hrs.) | |
| Example 17 | 18 | 2,3-Pentandione | No change | No rust | Viscosity increased after 90 days |
| Example 18 | 19 | 2,5-Hexandione | No change | No rust | Viscosity slightly increased after 90 days |
| Example 19 | 20 | Ethyl acetoacetate | No change | No rust | No change after 90 days |

EXAMPLES 20 To 24 AND COMPARATIVE EXAMPLE 2

In a four-necked flask equipped with a nitrogen inlet tube, a thermometer and a stirrer, 22.1 g (0.10 mole) of γ-aminopropyltriethoxysilane (molecular weight 221) and 200.0 g (2.00 mole) of methyl isobutyl ketone (molecular weight 100) were charged and subjected to a dehydrating reaction at 105° to 115° C. while distilling out the methyl isobutyl ketone and measuring the amount of distilled water, until 40% by mole of the γ-aminopropyltriethoxysilane reacted.

In order to compensate the distilled methyl isobutyl ketone, dehydrated methyl isobutyl ketone was added to keep its initial amount.

Then, 20.0 g of Aronix M-8060 (oligo-ester acrylate having terminal (meth)acryloyl groups viscous and liquid at ambient temperature, manufactured by Toa Gosei Chemical Industry Co. Ltd., calculated value of acryloyl equivalent: 136 g/equivalent) and 5.0 g of Epikote 1004 (bisphenol A type epoxy resin manufactured by Yuka Shell Epoxy K. K., epoxy equivalent 925 g/equivalent) were added and dissolved therein (Example 20). The amount of distilled methyl isobutyl ketone, the percentage of residual γ-aminopropyltriethoxysilane and the percentage of the resulting imine are shown in Table 6.

In Examples 21 to 24, compositions were prepared in the same manner as above, except that methyl isobutyl ketone was distilled out so as to control the percentage of reacted γ-aminopropyl triethoxysilane at about 60, 80, 90 and 100% by mole respectively and then dehydrated methyl isobutyl ketone, the oligo-ester acrylate and the epoxy resin were added.

In Comparative Example 2, the oligo ester acrylate and the epoxy resin were dissolved without carrying out the dehydrating reaction with methyl isobutyl ketone, in the same formulation as above. Thus, a uniform yellow colored transparent solution was obtained.

Each of these compositions was diluted with 67.0 g of toluene for the sake of viscosity control, and then subjected to the following tests.

A plate (70 ×150 ×0.8 mmt) which had been zinc plated and then treated with yellow chromate, was dip-coated with each of these solutions and air-dried. About 30 minutes later, its drying hardness (curability) to the touch was examined.

Further, 200 cc of each composition was weighed into a sealed glass bottle (capacity 225 cc) and stored at room temperature and the change in the state of the composition was observed. The results are summarized in Table 6.

EXAMPLES 25 TO 28 AND COMPARATIVE EXAMPLES 3 TO 4

In the same manner as in Example 20, 53.0 g of γ-aminopropyltriethoxysilane, 150 g of methyl ethyl ketone (molecular weight 72) and 150 g of toluene were charged and subjected to a dehydrating reaction by utilizing the azeotropy of water and toluene at 80 to 100° C. until the amount of distilled liquid reached 100 g. The percentage of the resulting imine was calculated based on the amount of water in the distilled liquid.

Into the solution thus obtained, Aronix M-8030 (oligo-urethane acrylate manufactured by Toa Gosei Chemical Industry Co. Ltd., calculated value of acryloyl equivalent:119 g/equivalent) and/or Epikote 1001 (bisphenol A type epoxy resin manufactured by Yuka Shell Epoxy K. K., epoxy equivalent : 475 g/equivalent) dissolved in ethylene glycol monomethyl ether were(was) added at the compounding ratio shown in Table 7, and the resulting mixture was homogenized to obtain resin solutions.

A steel plate which had been electrically zinc plated and subjected to electrolytic chromate treatment (manufactured by Nippon Steel Corp.) was dip-coated with each of these resin solutions and air-dried to obtain a coating film having a thickness of 5 to 7 microns. After dipping the coated plate in hot water (40° C.) for 10 days, lines were cut thereinto at intervals of 1 mm to form 100 squares by means of a cutter knife, a cellophane tape was pushed thereonto, and thereafter the tape was peeled off and the number of residual squares was counted. Further, a test piece prepared in the same manner as above was scratched with a cutter knife so that the flaw reached the base material, and then it was subjected to a saline water spraying test (JIS-Z-2371). After 240 hours, the width of corrosion expanded from the flaw was evaluated. Two hundred cc of the residual solution was charged into a glass bottle (225 cc in capacity) and sealed and then stored at room temperature, and the change in the state was observed. The results are summarized in Table 7.

TABLE 6

| | State of reaction | | | Curability at room temperature (after 30 min.) | Storage stability (room temp.) |
|---|---|---|---|---|---|
| | Amount of distilled MIBK (g) | Residual percentage*1 (% by mole) | Percentage of formation *2 (% by mole) | | |
| Comparative Example 2 | 0 | — | — | O Not sticky | X Gelation after one week |
| Example 20 | 60 | 63 | 37 | O Not sticky | O No change after 6 weeks |
| Example 21 | 91 | 39 | 61 | O Not sticky | O No change after 6 weeks |
| Example 22 | 101 | 20 | 80 | O Not sticky | O No change after 6 weeks |
| Example 23 | 124 | 8 | 92 | O Not sticky | O No change after 6 weeks |
| Example 24 | 143 | 2 | 98 | Δ Slightly sticky | O No change after 6 weeks |

TABLE 7

| | Formulation | | | | | Hot water dipping test | Saline water spray test | Storage stability |
| --- | --- | --- | --- | --- | --- | --- | --- | --- |
| | Imine formation (%) | Aronix M-8030 (g) | Epikote 1001 (g) | A/B*[1] | $\frac{(a+b)}{c/2}$ *[2] | (proportion of residual squares) | (after 240 hrs.) (width of corrosion) | stability (room temp.) |
| Comparative Example 3 | 54 | 72.0 | 0 | 100/0 | 0.84 | 90/100 | 3 mm | good for 3 months |
| Example 25 | 56 | 68.0 | 2.0 | 94/6 | 0.80 | 100/100 | <1 mm | good for 3 months |
| Example 26 | 54 | 36.0 | 36.0 | 50/50 | 0.53 | 100/100 | <1 mm | good for 3 months |
| Example 27 | 52 | 18.0 | 54.0 | 25/75 | 0.26 | 100/100 | <1 mm | good for 3 months |
| Example 28 | 50 | 0 | 72.0 | 0/100 | 0.15 | 70/100 | <1 mm | good for 3 months |
| Comparative Example | 55 | 12.0 | 0 | 100/0 | 0.15 | 50/100 | 3 mm | good for 3 months |

*[1] A = Weight of Aronix M-8030, B = weight of Epikote 1001
*[2] a = Number of acryloyl groups per gram of Aronix M-8030
 b = Number of oxirane rings per gram of Epikote 1001
 c = Number of amino (NH$_2$) groups per gram of the organic silicon compound

EXAMPLE 29

After mixing and dissolving together 20 g of γ-aminopropyltriethoxysilane (molecular weight 221) and 100 g of acetylacetone (molecular weight 100), the mixture was dehydrated with a molecular sieve. In the infrared absorption spectrum of the dehydrated solution thus obtained, the absorption peaks of ketone carbonyl groups (ca. 1715 and 1735 cm$^{-1}$) had disappeared. This suggests that the acetylacetone had been completely converted to the corresponding imine, and that the formation of the imine was approximately 100%.

A resin solution was prepared by adding and dissolving, into this reaction mixture, 30 g of γ-acryloyloxypropyltrimethoxysilane (molecular weight 248), 10 g of γ-glycidoxypropyltrimethoxysilane (molecular weight 236) and 150 g of ethylene glycol monomethyl ether.

A film of a polypropylene resin having a thickness of 300 microns was roll-coated with this solution and air-dried for one week to obtain a coating film having a thickness of 4 to 6 microns. The coated film thus obtained was subjected to an exposure test by means of a sunshine weather-o-meter for 240 hours. As a result, no change occurred in appearance, and no cracking took place even when it was bent to an angle of 180°. In a comparative experiment, the same film as used above which had not been coated with the resin solution was subjected to the same test. As a result, the surface smoothness was lost and cracks were readily formed when the film was bent. After these tests, the residual resin solution was charged in a glass bottle and sealed and then allowed to stand at room temperature for 3 months. During this period, the composition maintained its characteristic properties stably.

We claim:

1. A coating composition comprising (a) an imine obtained by reaction of an organic silicon compound having an aminoalkylgroup and at least one alkoxy group with an organic carbonyl compound having at least two carbonyl groups and (b) a bisphenol A-derived epoxy resin which is solid at ambient temperatures.

2. A coating composition according to claim 1, wherein the imine contains the unreacted organic silicon compound and organic carbonyl compound.

3. A coating composition according to claim 1, wherein the organic silicon compound is selected from the group consisting of aminoalkyltrialkoxysilanes, N-(aminoalkyl)aminoalkyltrialkoxysilanes, aminoalkylalkyldialkoxysilanes and N-(aminoalkyl)aminoalkylalkyldialkoxysilanes.

4. A coating composition according to claim 1, wherein the organic carbonyl compound is selected from the group consisting of diketone compounds and ketocarboxylic esters.

5. A coating composition according to claim 1, wherein the imine is produced without using any dehydration means.

6. A coating composition according to claim 1, wherein the imine is produced by use of a solvent forming an azeotropic mixture with water.

7. A coating composition according to claim 2, wherein a molar ratio of the imine to the unreacted organic silicon compound is 30–99:70–1.

8. A coating composition according to claim 1, which further comprises (c) a compound having at least one acryloyl or methacryloyl group.

9. A coating composition according to claim 8, wherein the compound having at least one acryloyl or methacryloyl group is selected from the group consisting of polyol poly(meth)acrylates, polyether poly(meth)acrylates, polyester poly(meth)acrylates, polyurethane poly(meth)acrylates, epoxy poly(meth)acrylates, mono(meth)acrylates and mono(meth)acrylates having an alkoxysilyl group.

10. A coating composition according to claim 8, wherein the compound having at least one acryloyl or methacryloyl group consists of a compound having at least two acryloyl or methacryloyl groups.

11. A coating composition according to claim 1, wherein the weight ratio of the imine to the bisphenol A-derived epoxy resin is 1:0.1–10.

12. A coating composition according to claim 11, wherein the weight ratio is 1:0.5–5.

13. A coating composition according to claim 8, wherein the total amount of oxirane rings and acryloyl or methacryloyl groups is 0.2–50 equivalents per equivalent of the imine.

14. A coating composition according to claim 8, wherein the total amount of oxirane rings and acryloyl or methacryloyl groups is 0.4–10 equivalents per equivalent of the imine.

15. A coating composition according to claim 8, wherein the weight ratio of the compound having at least one acryloyl or methacryloyl group to the bisphenol A-derived epoxy resin oxirane ring is 10/90–99/1.

16. A coating composition according to claim 15, wherein the weight ratio is 20/80–95/5.

17. A coating composition according to claim 1, which further comprises a solvent selected from the group consisting of aromatic hydrocarbons, alicyclic hydrocarbons, ketones, alcohols, esters and ethers.

18. A coating composition according to claim 8, which further comprises a solvent selected from the group consisting of aromatic hydrocarbons, alicyclic hydrocarbons, ketones, alcohols, esters and ethers.

19. A coating composition according to claim 1, which further comprises an additive selected from the group consisting of rust-proofing agents, condensation catalysts, thixotropic agents, antioxidants, ultraviolet absorbers, dyes and pigments.

20. A coating composition according to claim 8, which further comprises an additive selected from the group consisting of rust-proofing agents, condensation catalysts, thixotropic agents, antioxidants, ultraviolet absorbers, dyes and pigments.

* * * * *